TABULATOR

Filed Oct. 26, 1962 2 Sheets-Sheet 1

INVENTOR.
YOSHIYASU KIKUCHI
By
OSTROLENK, FABER, GERB & SOFFEN
ATTORNEYS

Nov. 15, 1966 YOSHIYASU KIKUCHI 3,286,237

TABULATOR

Filed Oct. 26, 1962 2 Sheets-Sheet 2

INVENTOR.
YOSHIYASU KIKUCHI

BY

OSTROLENK, FABER, GERB & SOFFEN

ATTORNEYS

United States Patent Office 3,286,237

Patented Nov. 15, 1966

3,286,237

TABULATOR

Yoshiyasu Kikuchi, Shiba Mita, Minatoku, Tokyo, Japan, assignor to Nippon Electric Company Limited, Minatoku, Japan, a corporation of Japan Filed Oct. 26, 1962, Ser. No. 233,280

Claims priority, application Japan, Oct. 28, 1961, 36/39,058

1 Claim. (Cl. 340—172.5)

This invention relates to high-speed printing devices and more particularly to electronic means for use with high-speed printers which is adapted to enable insertion of selected characters, blank spaces and non-zero print information in selected positions of coded data being transferred to the printing facility.

Present day electronic computing facilities are normally equipped with high-speed printers capable of printing alphabetic and numeric characters under control of electronic print-out circuitry. Quite frequently such computer facilities employ general purpose Braun tubes, special purpose Braun tubes, or other such cathode ray tube configurations. Tubes of these types operate such that the scanning function is a repetitive one wherein each alphabetic and numeric character is printed in a sequential manner, moving from the left to the right on a recording medium, which is fed in a continuous manner. Thus, alphabetic and numeric characters are printed on to the recording media in lines of such characters with the recording medium being shifted at the completion of each line of characters. In order that the characters to be printed are placed in the proper relationship and in the proper line of each line of printed characters, it is necessary to provide the input signals to the printing facility in synchronism with the recording position of the recording medium. In order to further provide complete printing potential, it is necessary that the capabilities of generating blank signals and non-printed sections and lines be included into the printing facility. Such capabilities are useful in that they greatly simplify both interpretation and further utilization through further computations or otherwise of the data which is printed.

Many present day computing facilities employ the conventional type-wheel flying printer which functions in such a manner that specified time delays are necessary in order to appropriately sort the characters to be printed, while the printing facility of the instant invention needs no such delay time, with the exception of the time necessary for moving to the printing positions in the recorded medium itself.

The instant invention provides electronic circuitry for producing high-speed printing operations having the capabilities of being able to insert specified characters at any predetermined positions, being able to insert a blank space or blank spaces at any predetermined positions, and being further capable of generating a zero-non-print for character positions lying beyond the most significant character position, in order to avoid the printing of zeros which are not needed for the purpose of interpreting and using the data after the printing operation.

The instant invention is comprised of electronic circuitry positioned between the storage means of the computer and the input to a high-speed printer which is capable of transferring binary coded signals therebetween representative of the data stored in the computer storage facility. Code emitter means are provided for generating binary coded signals representative of any selected alphabetic or numeric character, which character or characters are to be inserted into a selected position or selected positions of the code data transferred to the high-speed printer from the computer memory means. Additional circuitry is further provided for generating a blank space or blank spaces which are to be dispersed at elected positions within the data being transferred from core memory to printer input means. In addition to the above capabilities in printing applications wherein the length of the word to be printed is less than the character positions allotted for that word, the tabulator facility of the invention has the capability of generating zero-non-print signals so as to avoid printing zeros in these positions since such zero characters are not needed and only tend to confuse the reader in the interpretation of the data which has been printed.

It is therefore one object of this invention to provide tabulator means for high-speed printing facilities having the capability of inserting specified alphabetic and/or numeric characters into predetermined character positions of data being transferred to the high-speed printing facility.

Another object of this invention is to provide a tabulator means for high-speed printing facilities which is so adapted as to insert a blank space or blank spaces in selected positions of data characters being transferred to the high-speed printing facility.

Still another object of the instant invention is to provide a tabulator means for high-speed printing devices which has the capability of inserting non-zero-print spaces in a character position or character positions which lie beyond the most significant character position of the data words being transferred to the high-speed printing facility.

These and other objects of the instant invention will become apparent when reading the accompanying description and drawings in which.

Figure 1:
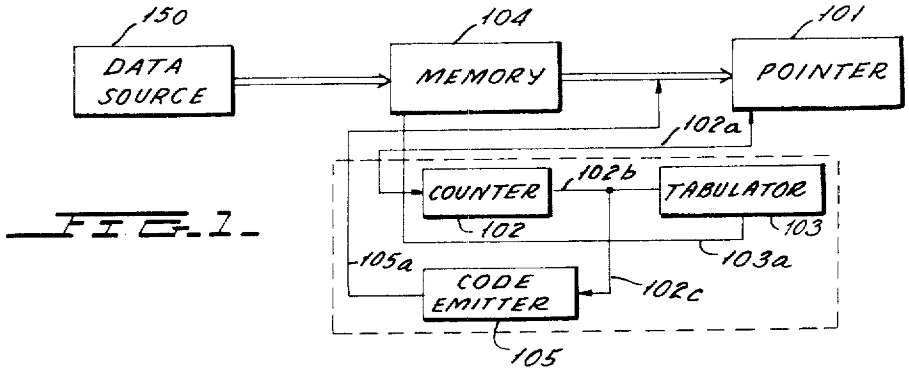
FIGURE 1 is a block diagram of a computer facility employing a tabulator means designed in accordance with the principles of the instant invention.

Referring now to the drawings: FIGURE 1 shows a computer facility 100 which is comprised of a scanning type printer facility 101 equipped with a flying spot scanner employing a special Braun tube which has the capability of printing each of the characters in a recording medium from the left to the right in a sequential manner. A counter 102 is employed for synchronizing the printing positions of each character printed on the recording medium and which generates signals corresponding to each printing position of each character to be printed at predetermined time postiions. It should be noted that in printing facilities in which no direct printing can be conducted on to the recording medium and the recorded characters which are first printed on an intermediate recorded medium are subsequently transferred by electronic means or otherwise, or copied to the ultimate recording medium. It should be understood that the instant invention is described with reference to use of the intermediate recording medium and that subsequent thereto this data can be later converted and impressed upon the final recording medium.

The tabulator circuitry of the instant invention is represented by block 103 which under control of the synchronizing counter 102 generates appropriate signals for the insertion of predetermined characters and/or blank spaces as desired. The remaining elements of the facility 100 is comprised of a data source 150 which may, for example, be a computer arithmetic unit and a memory means 104 which is a random access instantaneous read-out memory unit such as, for example, a magnetic core or ferrite plate memory device. The memory means 104 may be the interior or peripheral memory means of the computer. That is, the memory means 104 may be employed both as the memory unit used during the computational process which is used to store constance and data which is to be subsequently operated upon in order to obtain the final values desired and further as the memory means for receiving data which has been completely operated upon and which is placed in readiness for transfer to the printing facility, or in the alternative, separate memory means may be used for the above functions.

The operation of the computer facility 100 is as follows:

The counter 102 is adapted to generate a cumulative count with an increase of one binary bit in synchronism with the printing facility 101 moving to the next character position for the line being printed by the printer. This synchronism is maintained by means of the line 102a between printer 101 and counter 102. The count is transferred from lead 102b of counter 102 to tabulator 103 and code emitter 105 by means of lead 102c. While the connections between counter 102 and tabulator 103 for code emitter 105 are shown by single leads, it should be understood that patch cords [not shown] may be employed so as to generate any predetermined binary code combination by connecting the patch cords between the output terminals of the counter 102 to the input terminals of the tabulator 103 and the code emitter 105.

The signals impressed upon the tabulator 103 cause it to control the memory means 104 by lead 103a so as to transfer characters in the form of binary code signals stored in memory 104 into the input terminals of the printer facility 101. The tabulator 103 is adapted to generate first the address selection signals in order to select the appropriate character stored in that address of memory 104 and secondly to generate a read-out signal so as to transfer this code character stored in the selected address to the input terminals of printer 101. Counter 102 is further connected to code emitter circuit 105 in such a manner that code emitter 105 is adapted to generate signals representative of either alphabetic or numeric characters at predetermined counts of counter 102. These characters are then transferred via lead 105a to the input of printer means 101. At such times when characters are to be impressed upon the input of printer means 101, the tabulator 103 operates to inhibit memory 104 from transferring data to the printer means 101. The memory 104 is capable of storing at least one entire word comprised of a plurality of coded characters and preferably is capable of storing a plurality of such words which are transferred from the data source 150 of the computer facility 100. Thus, the code emitter circuit 105 is capable of generating any optional characters which may be printed at any selected printing positions independently of the contents stored in memory means 104 whereby these optional characters are transmitted to printer 101 by means of the transfer line 105a.

Figure 2:
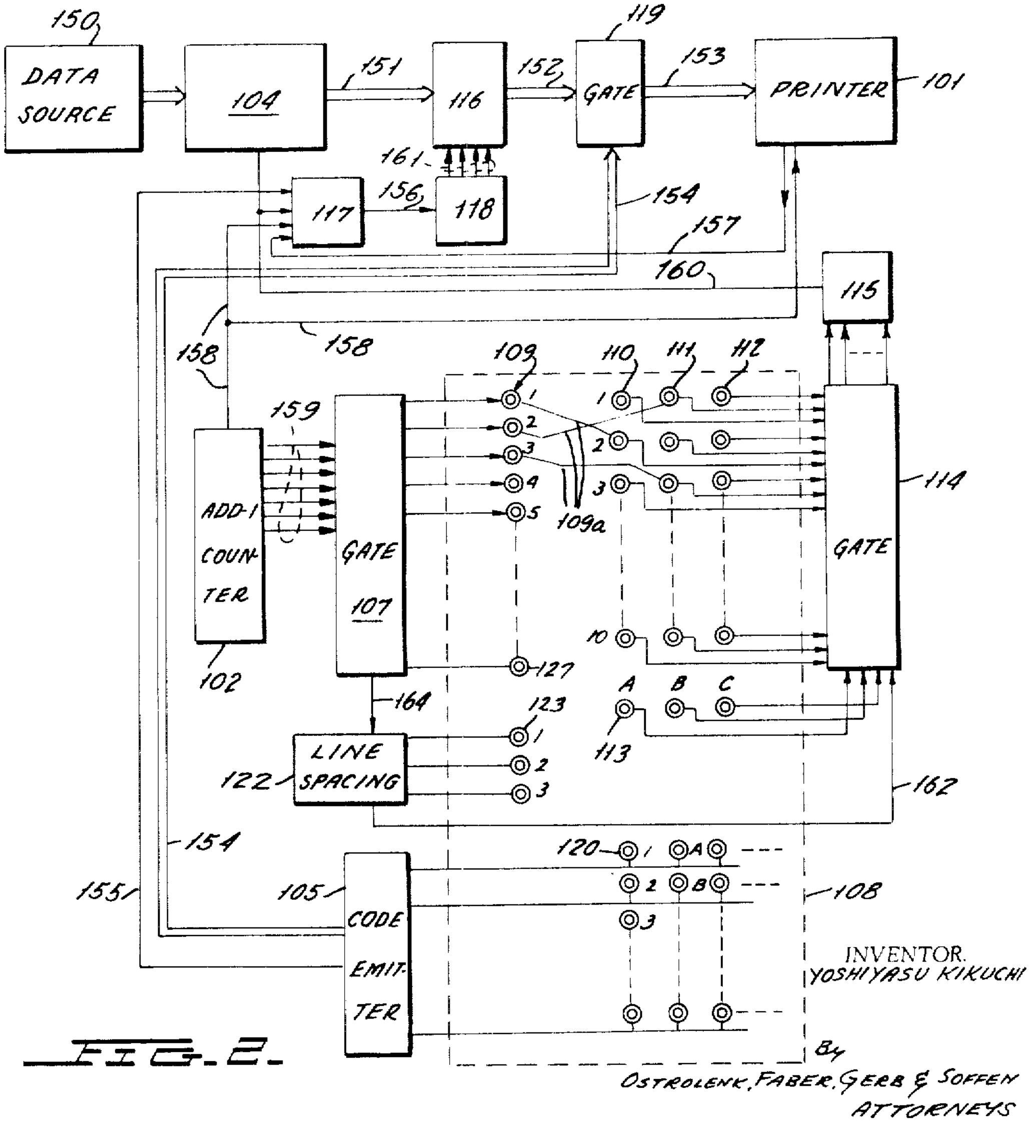
FIGURE 2 is a block diagram showing portions of the tabulator means of FIGURE 1 in greater detail.

The facility 100 is shown reproduced in FIGURE 2 of the drawings, showing the tabulator and code emitter blocks in greater detail. As previously mentioned, the random access core memory employed in the invention is capable of reading-out at least one and preferably several words so as to reduce the number of switching gates for different kinds of information which may be stored therein and further to allow the memory 104 sufficient time to make it possible to employ memory 104 in the computer computational operations as well as the print-out operation. However, as previously recited, if a second core memory is employed, the other memory [not shown] may be utilized for all purposes other than the high-speed operation function.

As shown in FIGURE 2, counter 102 is an add-one counter of seven binary bit capacity which counts $2^7$, that is, from $n=0$ to $n=127$, in sequential fashion, and synchronously with the printing speed per character of the printer 101. Thus, binary codes respectively corresponding to the printing positions from 0 to 127 on the line-to-line spacing of the recording medium of the printer 101 are obtainable in this fashion. The binary code combinations generated by the add-one counter 102 are impressed upon gate circuit 107 whose output terminals are connected to the position hub terminals of the hub group 109 contained on a patching board 108 where the 127 hub terminals of the hub group 109 appear in the patching board 108 as openings having electrical terminals 1 through 127 suitable for receipt of one end of a patch cord, such as, for example, the patch cords 109a. Thus, when the printing position on the recording medium [not shown] chronologically steps from 1, 2, 3, . . . to 127 at predetermined time intervals thus signals appear in this sequential fashion at the hubs 1, 2, 3, . . . 127 of the hub group 109.

The hub groups 110, 111, and 112 of FIGURE 2 are those which designate the address number, i.e., the binary coded combination representative of the addresses of memory unit 104 in which specified character codes are stored. By connecting from the position hubs of hub group 109 to the hubs of hub groups 110, 111 and 112 by means of patch cords 109a, for example, the appropriate printing position signals are transferred from the hub terminals of hub groups 110, 111 and 112 to the input terminals of gate circuit 114. Gate circuit 114 then impresses the suitable address signals to circuit 115 where the address number signals corresponding to the location of the address number designating hubs 110, 111 and 112, together with the memory read-out order is converted and formed. Upon receipt of the address selection signals at memory unit 104 from circuit 115 the memory content of at least one and alternatively several words having been designated, this data is transferred from memory means 104 into an intermediate storage means 116. In accordance with the type of tabulation information being handled, it is further possible to modify the tabulation operation by means of the pick-up hubs ABC of hub group 113 which permit position switching among the hubs of hub groups 110, 111 and 112 simply by changing the patch cords for only the hubs ABC of hub group 113. This thereby alleviates changing all of the patch work which may exist between output hub terminals of group 109 and the input hub terminals of groups 110, 111 and 112, while at the same time permitting position switching to occur between the groups of the input hub terminals.

Subsequent to the transfer of an encoded word or of encoded words into the intermediate memory 116, the circuit 115 which generates the memory read-out signal simultaneously therewith impresses this signal through lead 160 upon both memory means 104 and gate 117. This permits the synchronizing signals from the add-one counter 102 or printer 101 to be impressed by means of conductors 158 and 157, respectively, upon gate circuit 117 so as to operate the register read-out counter 118 so that the character codes are removed in a manner synchronous with the printer operating speed from intermediate memory 116 through cable 152 to gate circuit 119. In this manner, data flowing in the normal fashion may be transmitted from the data source 150 and suitably printed by the printing means 101.

In order to print any other desired characters, at any preselected positions independent of the contents of memory means 104, the code emitter circuit 105 is provided with a hub matrix 120 which may be connected to the hub terminals of hub group 109 by suitable patch cords (not shown) so as to generate a variety of preselected coded characters for insertion at preselected positions so as to be printed by the printing facility 101. The coded information corresponding to the selected letter to be inserted, is then transmitted from the code emitter circuit 105 via cable 154 to one input of gate 119 which subsequently transfers this information to the input of printer means 101 via cable 153. Output line 155 connecting code emitter 105 to one input terminal of gate 117 carries an inhibit signal gate 117 thereby preventing the contents of intermediate storage means 116 to be transferred to printer means 101 during the time or times at which coded characters are being inserted into printer means 101 via the code emitter circuit 105.

Figure 3:
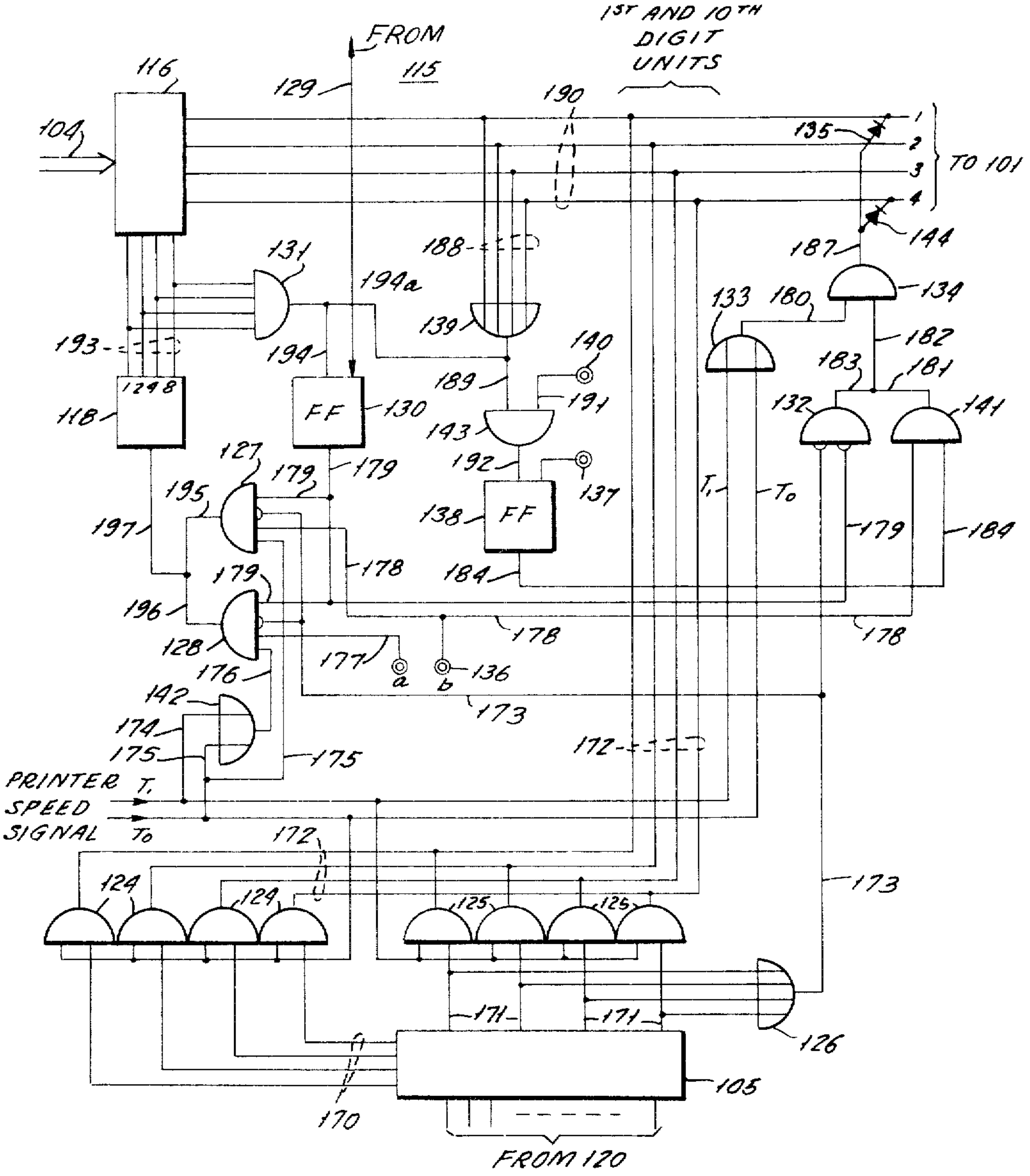
FIGURE 3 is a logical diagram of portions of the tabulator of FIGURE 2 showing certain portions thereof in greater detail.

If it is desirable to provide line skips of one, two, or three units, the gate circuit 122 connected to gate circuit 107 via lead 164 transmits a signal via conductor 162 to gate 114 in order to provide the chosen line skipping specified by the spacing hubs, 1, 2 and 3 of the hub group 123 so as to inhibit circuit 115 from emitting the address selection and memory read-out signals during the period at which the line feed operation is being carried out. Referring now to FIGURE 3 which will be employed for the purpose of describing in greater detail the insertion of codes from the code emitter, the insertion of blank codes, the switching of digits and the zero-non-print operation, the following assumptions will first be made:

The code format employed in the instant invention is the binary decimal four-bit parallel code group. This means that each code group is made up of four binary bits designated 1, 2, 4 and 8 and that all such code groups throughout their usage are transferred from one circuit to another in parallel fashion as opposed to serial fashion. Numeric characters are represented by one such four-bit parallel code group, while alphabetic characters are represented by two four bit parallel code groups. For sake of simplicity, it will be assumed that a digit position corresponding to the ones digit position (in the decimal numbers system) will be occupied by the code group which is representative of a numeric character. An alphabetic character is represented by a code group in the tens digit position and the ones digit position. As examples, the numeric characters are represented by the binary coded representation for each decimal character 0 through 9. The alphabetic characters will likewise have binary coded decimal representation in the ones position as well as in the tens position so that, as one example, the alphabetic character "a" would be represented by 11. The alphabetic character "b" represented by 12, "c" represented by 13, "d" represented by 14, and so forth. The decimal representations where binary bits are weighted 8421 would represent the decimal number 1 by 0001, decimal 2 by 0010, decimal 3 by 0011, and so forth. Thus, it can be seen that one code group stored in memory 104 represents a numeric character while two code groups stored in memory 104 represents an alphabetic character. The further makeup is such that twelve such code groups form a word wherein if the word is a numeric word it contains twelve decimal digits, whereas if the word is an alphabetic word it contains six alphabetic characters. When the alphabetic character code groups are sent to the printer means 101, it should be understood that all the character codes must then be converted into the two-group form.

As can be seen from FIGURE 3, the intermediate register 116, the register read-out counter 118 and the code emitter circuit 105, have been reproduced therein so as to show all of the detailed circuitry interconnecting these elements. The arrangement of FIGURE 3 is provided with an input $T_0$ which receives a synchronous signal employed to be synchronized with the printing speed per digit position of the printer means 101. A second input line $T_1$ is provided for receiving a second synchronizing signal having a predetermined delay relative to the synchronizing signal $T_0$. The appearance of synchronizing signal $T^0$ is representative of the ones digit position time interval whereas the second synchronizing signal $T_1$ is representative of the occurrence of a tens code group format. The first example to be considered is the case where data is transferred from the memory means 104 to the printing means 101 without any blank spaces, preselected characters, or non-zero-print operations being performed:

The gate circuit 114 [see FIGURE 2] has been so interconnected with the gate circuit 107 to cause gate circuit 115 to select specified addresses and generate a memory read-out signal and transfer data from memory means 104 into intermediate memory 116. Immediately thereafter, the synchronizing signals $T_0$ and $T_1$ are impressed upon OR gate 142 via leads 175 and 174, respectively. OR gate 142 impresses its output upon AND gate 128 via conductor 176. At this time since no specified characters are to be interspersed into the data to be transferred to printing means 101 the code emitter circuit 105 is in a deenergized state so that no signals appear at its output terminal groups 170 and 171. This deenergized state is conveyed to OR gate 126 whose output conductor 173 is connected to the inhibit terminals of AND gates 128 and 127, respectively. Thus, the absence of signals on these inhibit terminals conditions gates 127 and 128 into passing signals. As can be seen conductor $T^0$ is further connected via conductor 175 to the input of AND gate 127 so that at least one of the gates 127 and 128 is conditioned to be energized each time either signals $T_0$ or $T_1$ are present.

Hub terminals *a* and *b* are provided for conditioning the circuitry of FIGURE 3 to printing of either alphabetic or numerous characters. In the case where alphabetic characters are to be printed, a signal is impressed upon hub terminal *b* such that AND gate 127 is conditioned to be energized each time a signal $T_1$ or $T_0$ is present. This enables the printing of twelve numeric characters for a code where a numeric can be more fully described. If a signal is impressed upon hub terminal *b* this is impressed upon AND gate 127 via conductor 178 only upon the appearance of signal $T_0$ so as to generate a word of twelve code group length, but which contains six numeric characters in a manner to be more fully described.

Assuming that terminal *a* of hub group 136 is energized and terminal *b* is unenergized, in the appearance of either signals $T_1$ or $T_0$ together with the energized state of terminal *a*, no output being generated by code emitter 105 and a binary one condition at terminal 179, AND gate 128 generates an output signal at its terminal 196. The energized condition at terminal 179 of AND gate 127 is generated by a flip-flop circuit 130 which is controlled to generate a binary one condition at terminal 179 under control of circuit 115, shown in FIGURE 2, via conductor 129, which signal impressed upon flip-flop 130 recognizes the condition of transfer of data from memory means 104 to printing means 101 as opposed to insertion of data from the code emitter 105. Thus the binary one, or energized condition, of gate 127 is impressed upon the terminal 197 of register read-out counter 118. Counter 118 has at least four binary digit positions labeled 1, 2, 4, 8, as shown in FIGURE 3 so that it is capable of generating code combinations at its output terminals 193 representative of 12 character positions for the print means 101. Number 12 was selected as previously described to represent one word which consists of 12 code groups or six alphabetic characters, or alternatively which consists of 12 code groups representative of 12 numeric characters. Synchronizing signal $T_0$ is impressed upon gate 127 causing read-out counter 118 to be stepped six times during the period in which six signals from $T_1$ are energized as well so that six numeric characters are transferred out of intermediate memory 116 under control of read-out register 118. With hub terminal *a* being energized, register 118 is stepped twelve times over a word interval causing twelve code groups to be transferred from intermediate register 116 to printing means 101 via output leads 190. When twelve complete groups have been transferred from intermediate memory 116 under control of read-out register 118, this condition is sensed by AND gate 131 which generates an output signal at its terminal 194, which in turn is impressed upon a second input terminal of flip-flop 130 resetting flip-flop 130 and removing the energized state from the output terminal 179 of flip-flop 130. This closes AND gate 127 so as to terminate stepping of read-out counter 118. At this time if no more signals designating a memory read-out operation are impressed upon the input terminal 129 of flip-flop 130, counter 118 remains in the non-stepping condition.

Considering now the operation of insertion of predetermined characters in selected positions of a line to be printed, it should be understood that no memory read-out signal will be impressed upon input line 129 so that output terminal 179 of flip-flop 130 remains in the deenergized state. This closes both gates 127 and 128 thereby preventing counter 118 from stepping so as to shift data out of intermediate register 116.

Simultaneous with this inhibit control operation synchronizing signals $T_0$ and $T_1$ are impressed upon one input terminal of the gate groups 124 and 125, respectively. These AND gate groups are connected to the output terminals of code emitter circuit 105 via leads 170 and 171, respectively. Code emitter 105 is so constructed as to generate predetermined binary code combinations in four-bit parallel code groups which are then suitably impressed upon the input terminals of the AND gate groups 124 and 125. Assuming the presence of synchronizing signal $T_0$, this conditions gate group 124 to open so that its output terminals 172 which are connected to the lines 190 leading to the input of printing means 101 to transfer this code group to the input of the printing means. As the synchronizing signal $T_0$ is removed and synchronizing signal $T_1$ appears AND gate group 124 is closed and AND gate group 125 opens to impress the code groupage from group 125 via the same leads 172 to the transfer conductors 190. Code emitter 105 is further adapted to present code groups to both gate groups 124 and 125 for the transmission of alphabetic characters and to present code groups only to gate-group 124 for the printing of numeric characters.

If it is desirable to insert blank spaces between certain characters, this is performed by means of OR gate 126 whose input terminals are connected to the output terminals 171 from code emitter 105. The output terminal of OR gate 126 is connected to the inhibit input terminal 173 of gate 132. Thus if the signal is present on any one of the lines 171 OR gate 126 causes gate 132 to be inhibited from generating an output signal. As a further condition, line 173 is connected to the inhibit input terminals of gates 127 and 128 preventing counter 118 from stepping in a manner as was previously described. A second inhibit terminal 179 of gate 132 is connected to the output terminal of flip-flop 130 such that gate 132 generates an output signal when flip-flop 130 is deenergized [denoting a time interval in which no memory read-out signal is present] while the input inhibit terminal 173 carrying no signal denotes that no code group is being generated by code emitter 105. The absence of inhibit signals on gate 132 causes an output to be generated at terminal 163 which is impressed upon input terminal 182 of AND gate 134. The second input terminal of AND gate 134 is connected to the output terminal 180 of OR gate 133 whose input terminals receive the synchronizing signals $T_1$ and $T_0$. In the absence of a code group being generated by code emitter 105 and in the absence of a memory read-out signal generated by gate circuit 115, shown in FIGURE 2, and in the presence of either synchronizing signal $T_0$ or $T_1$, AND gate 134 is connected to the transfer conductors 190 via the diodes 135 and 144 which are connected to the 1 and 8 lines of transfer cables 190 to generate a decimal 9 therethrough. Thus, in order to represent one blank space two binary coded decimal 9 conditions are transferred to the printing circuit which is interpreted at the printing means 101 as the blank code indicative of a blank space which is to be inserted into the recording medium by printing means 101. The code 99 is generated due to the presence of both synchronizing signals $T_0$ and $T_1$ within a single character interval. This condition persists until a memory read-out signal appears in line 129 or until the code group is generated by code emitter circuit 105 in order to inhibit gate 132. Thus one or a plurality of blanking signals may be generated in this manner. It should be understood that the code employed to represent a blank condition need not be 99 as in the embodiment described herein, but may be any other suitable combination desired.

In order to generate a zero-non-print so that decimal zeros above the most significant digits in numeric information are not printed, this operation is controlled by impressing a printing position signal on the zero-non-print start hub terminal 137 by means of suitable patching cords, as was previously described. The zero-non print operation can be understood to be the following:

Let it be assumed that while each word may contain six numeric characters, the word to be printed may be of the format 00105. This may be represented, as can clearly be seen, as 105 wherein the zeros in the three left-hand most positions of the word carry no significance. It is therefore desirable to omit printing of these three zeros which is carried out by the invention in the following manner:

The presence of a zero-non-print signal upon hub terminal 137 causes flip-flop 138 to be set thereby energizing the output lead 184 of flip-flop 138. This energized state is impressed by means of lead 184 upon AND gate 141. The hub terminal *b* of hub group 136 is in the energized state denoting the transmission of numeric characters, thus causing AND gate 141 to generate a binary one condition [i.e., an output signal], which is then transferred through AND gate 141 to the input terminal 182 of gate 134. Coincidence of this condition, together with the synchronizing signals $T_1$ and $T_0$ causes a blank space to be impressed upon the transfer conductors 190 via the diode members 135 and 144 in the same manner as was previously described. These blank spaces may be repeated until the presence of a code group is detected by OR gate 139 whose input leads 188 are connected to transfer conductors 190. This condition is transferred via the output terminal 189 of OR gate 139 to one input terminal of AND gate 143. This signal, together with a signal which occurs subsequent in time to the zero-non-print signal impressed upon terminal 137 at hub 140 causes gate 143 via its output terminal 192 to reset flip-flop 138 thus inhibiting gate 141 and subsequently inhibiting a blank space condition from being impressed upon the transfer conductors 190 via diodes 135 and 144. If it is desired to terminate the zero-non-print operation, at the same time of the completion of transfer of one word to the printing means 101, this is perfected via the lead 194*a* from the output of AND gate 131 which is impressed upon one input terminal of OR gate 143 so that upon the completion of transfer of a complete word from intermediate memory 116, flip-flop 138 is reset to inhibit the insertion of a blank space condition upon transfer cables 190.

With the above arrangement which has been described, the incorporation of circuits necessary for skip-control, selector, information designation, delay counting facilities, complete tabulation operations are then capable of being performed by the instant invention. However, such skip-control circuits and so forth mentioned above may be employed or omitted depending upon the needs of the individual user and these circuits lend no novelty to the device of the instant invention.

The above described preferred embodiments refer to the case when the calculating section 150 of a computer, the core memory 104 and the printer 101 are integrally connected to one transfer line group 190. It should be understood, however, that data from the calculating section of a computer or from a data logger may be first stored in memory other than those described herein, such as, for example, magnetic tape, magnetic drums and so forth, or such signals may be transferred through a transmission line such as data transmission, telephone transmission, teletype transmission, and so forth, may be employed in place of the computer arrangement described herein with the result that larger amounts of information can be transmitted or accumulated within a unit time by use of the tabulator and code emitter circuits of the instant invention, which arrangement is a vast improvement over prior-art devices. In the alternative, the information instead of being printed may be transferred from the transfer cables 190 to some storage means, such as, for example, the magnetic tape, magnetic drum and so forth, so as to be available for printing at any later time.

It can therefore be seen that the instant invention provides an all electonic high-speed circuit cooperative with high-speed printing devices, the capabilities of inserting predetermined alphabetic or numeric characters into a data format being transferred to a high-speed printing circuit at preselected positions therein and which is further capable of generating blank space and non-zero-print space operations as well as line-skip operations. All of these operations being capable of being carried out at speeds being substantially greater than present day systems of the same general type.

Although there has been described a preferred embodiment of this novel invention, many variations and modifications will now be apparent to those skilled in the art. Therefore, this invention is to be limited, only by the specific disclosure herein, but only by the appending claim.

The embodiments of the invention in which an exclusive privilege or property is claimed are defined as follows:

Means for controlling the manner in which data stored in a memory is to be printed comprising:

memory means storing a plurality of addressable coded characters;

printing means for printing characters on a line by line basis;

multi-stage counter means for developing a cumulative count equal to the number of characters which may be printed on each line;

said counter means advancing said printer to print the next line of characters when said counter means reaches its maximum count;

a first group of logic gates being coupled to the counter means and having output terminals substantially equal in number to said maximum count;

a second group of logic gates fewer in number than said first group;

first patchcord means for selectively coupling said first and second group of logic gates to generate differing address codes as said counter means is advanced;

a third group of logic gates fewer in number than said first group;

second patchchord means for selectively coupling said first and third group of logic gates to generate differing control code formats as said counter means is advanced;

Transfer means controlled by said printer means and said first group of logic gates for transferring characters from said memory means in synchronism with the operating speed of said printer means;

said second group of logic gates including means to inhibit said transfer means when said counter means reaches certain predetermined counts;

means coupled between said third group of logic gates and said printer means for inserting coded characters during the time said transfer means is inhibited;

a non-print signal generating source;

means coupled to the outputs of said memory means and said non-print generating source to prevent said printer means from printing a character whenever the address position being transferred out of said memory means does not contain a character and when said non-print source is energized.

References Cited by the Examiner

UNITED STATES PATENTS

| | | | |
|---|---|---|---|
| 2,848,708 | 8/1958 | Burkhart | 340—173 |
| 2,853,696 | 9/1958 | Mendelson | 340—173 |
| 2,944,733 | 7/1960 | Austen | 235—61.6 |
| 3,107,342 | 10/1963 | Estrems | 340—172.5 |
| 3,119,098 | 1/1964 | Meade | 340—172.5 |

ROBERT C. BAILEY, *Primary Examiner.*

P. L. BERGER, *Assistant Examiner.*